(No Model.)

J. E. PORTER.
SLING FOR HAY ELEVATOR ROPES.

No. 275,850. Patented Apr. 17, 1883.

Witnesses:
S. S. Schaff
Dwight J. Holdridge

Inventor:
Joseph E. Porter

UNITED STATES PATENT OFFICE.

JOSEPH E. PORTER, OF OTTAWA, ILLINOIS.

SLING FOR HAY-ELEVATOR ROPES.

SPECIFICATION forming part of Letters Patent No. 275,850, dated April 17, 1883.

Application filed February 21, 1883. (No model.)

*To all whom it may concern:*

Be it known that I, JOSEPH E. PORTER, of Ottawa, in the county of La Salle and State of Illinois, have invented certain new and useful Improvements in Slings for Hay-Elevator Ropes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to furnish an improved sling for supporting the hay-elevator rope used in connection with my single-tree sling patented to me April 18, 1882, and numbered 256,734, by means of which said elevator-rope is prevented from dragging on the ground and tangling about the feet of the horse or its driver, whereby petty accidents and delays are avoided. This I accomplish by placing a number of rings on the guide-rope of the aforesaid patent and suspending from each a rope, in the lower end of which is an eye through which the elevator-rope passes. These slings are connected by a suitable cord, which allows them to be separated equal distances apart, so that when the horse travels forward from his first position near the barn, a distance equal to the interval between the slings, the first sling following the single-tree sling would be moved when twice that distance the second sling would likewise move, and so on until the entire distance to be traveled by the horse is covered and all the slings have been moved outward from the barn, supporting the draft-rope at equal distances apart.

Figure 1:
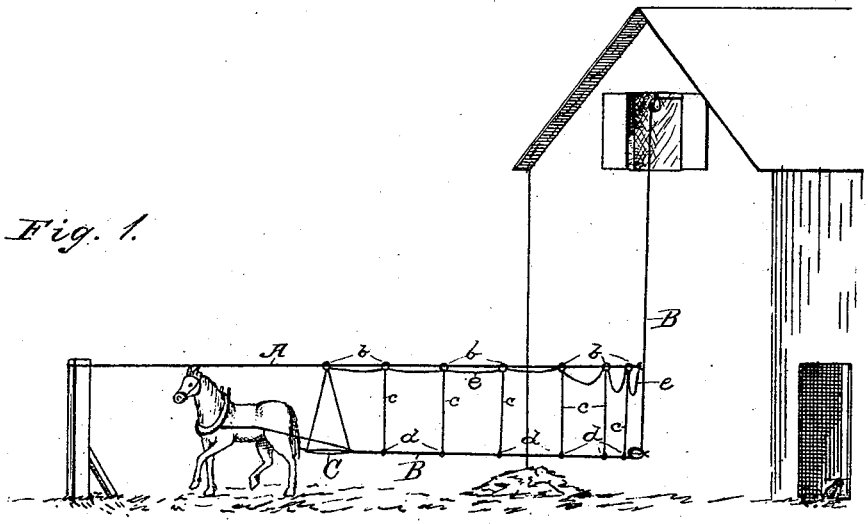
Figure 2:
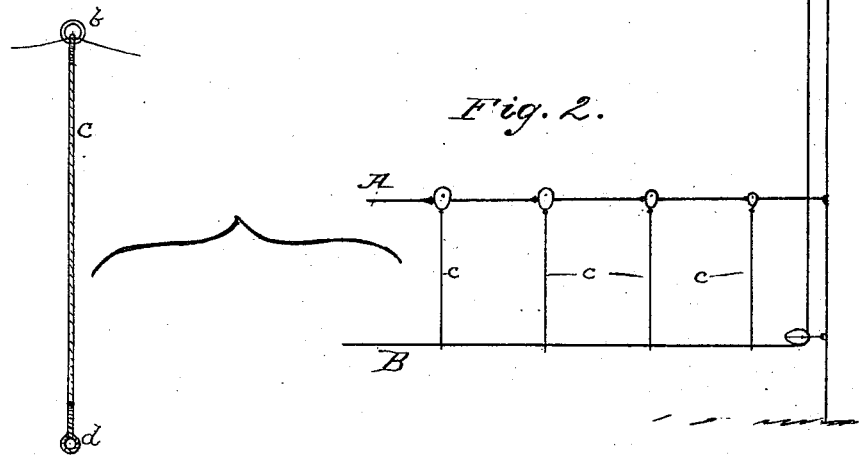

In the drawings, Figure 1 is a perspective view of my invention, and Fig. 2 shows a modification of the same.

A represents a guide-rope stretched taut from the barn to a suitable object—say a post—on the line of draft and at a plane above the horse's head.

B represents the hay-elevator rope for operating a hay-carrier; and C, the single-tree, to which the elevator-rope is attached, and which is supported from off the horse's heels by a sling depending from a sheaf or its equivalent traveling on said guide-rope, substantially as described in the aforesaid Letters Patent.

On the guide-rope are placed a given number of rings, $b\ b$, from each of which is suspended a rope, $c$. All of these ropes are preferably of the same length, and have eyes $d\ d$ in their lower ends through which passes and is supported the hay-elevator or draft-rope B. These slings are connected by a suitable cord, $e$, which allows the slings to be separated an equal distance apart, one end of which is affixed to the barn, the other to the sling supporting the single-tree. Thus when it is desired to make a trip of the hay-carrier and the horse is driven out from the barn the slings will be drawn out one after the other at regular intervals to support the draft-rope. When the return trip is made the sheaf will push against the rings of the slings until they are back in their first position.

Many modifications can be made of my invention; but I consider all intermediate slings between the barn and single-tree sling as an infringement.

In Fig. 2 of the drawings is shown a modification of my invention in which a number of pulleys of graduated sizes, commencing with that nearest the barn to the largest supporting the single-tree sling, are utilized, each of which when it has been drawn its allotted distance is anticipated by a stop on the guide-rope especially adapted for that purpose, and each passes over all intermediate stops between the barn and its point of destination.

What I claim as new, and desire to secure by Letters Patent, is—

1. The combination of the slings, the guide-rope from which said slings depend, and the draft-rope of a hay-elevator, whereby said draft-rope is prevented from dragging on the ground.

2. The combination of the rings $b$, rope $c$, and eyes $d$, substantially as hereinbefore set forth.

3. The combination of the guide-rope, the slings, and the cord connecting said slings, as and for the purpose specified.

In testimony that I claim the foregoing as my own I hereunto affix my signature in presence of two witnesses.

JOSEPH E. PORTER.

Witnesses:
JAMES H. COYNE,
F. D. THOMASON.